US007483905B2

(12) United States Patent  
Gauweiler

(10) Patent No.: US 7,483,905 B2  
(45) Date of Patent: Jan. 27, 2009

(54) DATABASE ACCESS DEVICE AND METHOD OF ACCESSING A DATABASE

(75) Inventor: Thomas Gauweiler, Speyer (DE)

(73) Assignee: SAP AG, Walldorf (DE)

( * ) Notice: Subject to any disclaimer, the term of this patent is extended or adjusted under 35 U.S.C. 154(b) by 525 days.

(21) Appl. No.: 10/672,514

(22) Filed: Sep. 25, 2003

(65) Prior Publication Data

US 2004/0249857 A1 Dec. 9, 2004

Related U.S. Application Data

(62) Division of application No. 10/455,294, filed on Jun. 4, 2003.

(51) Int. Cl.
*G06F 17/00* (2006.01)
(52) U.S. Cl. .......................... 707/101; 707/10; 707/203; 711/205
(58) Field of Classification Search ............. 707/104.1, 707/205, 10, 101, 203; 711/3, 148, 205; 455/412.1, 3.01; 709/217
See application file for complete search history.

(56) References Cited

U.S. PATENT DOCUMENTS 5,347,653 A * 9/1994 Flynn et al. ................. 707/203
5,440,730 A * 8/1995 Elmasri et al. .............. 707/203

(Continued)

FOREIGN PATENT DOCUMENTS

WO WO 00/34863 6/2000

OTHER PUBLICATIONS

"Dynamic database management system", The Free On-line Dictionary of Computing, by Denis Howe, printed Feb. 28, 2005.

(Continued)

*Primary Examiner*—John Cottingham
*Assistant Examiner*—Robert Timblin
(74) *Attorney, Agent, or Firm*—Kenyon & Kenyon LLP

(57) ABSTRACT

A method for accessing a database is provided. The method includes creating in a design environment a file that defines a metadata. The metadata relates at least one business object and at least one query. The method also includes communicating the file to a mobile device, storing the file on the mobile device, and transforming the file into a binary structure at an initial run of a computer application running on the mobile device. The binary structure is adapted to be read by the computer application. The method also includes recording the binary structure in a memory of the mobile device. A method for providing database access for a plurality of files with a limited number of database access channels is provided. A method for is provided for accessing a database in a computing environment for a plurality of recordsets. Each of the plurality of recordsets is associated with a database access channel for fetching records of the plurality of recordsets from the database upon occurrence of a preselected event. A method of fetching data for a plurality of active file from a database having a limited number of database connections is provided. A computer readable medium is provided which stores instructions executable by a computer. The instructions include a method for providing database access for a plurality of files with a limited number of database access channels. A device for accessing a database is provided. A system for updating a database access program is provided.

4 Claims, 11 Drawing Sheets

U.S. PATENT DOCUMENTS

| | | | |
|---|---|---|---|
| 5,717,919 A * | 2/1998 | Kodavalla et al. | 707/8 |
| 5,794,229 A * | 8/1998 | French et al. | 707/2 |
| 5,933,654 A * | 8/1999 | Galdun et al. | 710/23 |
| 6,035,301 A | 3/2000 | Siegel et al. | 707/102 |
| 6,108,686 A | 8/2000 | Williams, Jr. | 709/202 |
| 6,115,790 A * | 9/2000 | Schimmel | 711/119 |
| 6,216,137 B1 * | 4/2001 | Nguyen et al. | 707/203 |
| 6,216,199 B1 * | 4/2001 | DeKoning et al. | 711/3 |
| 6,240,421 B1 | 5/2001 | Stolarz | |
| 6,282,709 B1 | 8/2001 | Reha et al. | |
| 6,393,506 B1 | 5/2002 | Kenny | |
| 6,470,360 B1 * | 10/2002 | Vaitheeswaran | 707/205 |
| 6,631,386 B1 * | 10/2003 | Arun et al. | 707/203 |
| 6,631,432 B1 | 10/2003 | Yamagishi | |
| 7,051,080 B1 * | 5/2006 | Paul et al. | 709/217 |
| 7,072,672 B1 | 7/2008 | Vanska et al. | |
| 2001/0056504 A1 | 12/2001 | Kuznetsov | |
| 2002/0116486 A1 | 8/2002 | Toure et al. | 709/223 |
| 2002/0188761 A1 | 12/2002 | Chikirivao et al. | |
| 2003/0221051 A1 * | 11/2003 | Hand et al. | 711/106 |
| 2004/0003013 A1 | 1/2004 | Coulthard et al. | |
| 2004/0019892 A1 | 1/2004 | Sandhya et al. | |
| 2004/0123038 A1 * | 6/2004 | Shami et al. | 711/132 |
| 2004/0205092 A1 * | 10/2004 | Longo et al. | 707/205 |

OTHER PUBLICATIONS

"Relational database", The Free On-line Dictionary of Computing, by Denis Howe, printed Feb. 28, 2005.

* cited by examiner

FIGURE 1

DESIGN ENVIRONMENT 11

Mobile Application Studio 17
- Interaction Component Modeler 18
- Business Object Modeler 19
- BDoc Modeler 20

↓ 21a    ↓ 21b    ↓ 21c

RUN-TIME ENVIRONMENT 10

12

- User Interface Layer 13
- Interaction Layer 14
- Business Object Layer 15
- Transaction Layer 16

DATABASE ACCESS DEVICE AND METHOD OF ACCESSING A DATABASE

CROSS-REFERENCE TO RELATED APPLICATION

This application is a divisional of U.S. patent application Ser. No. 10/455,294, filed Jun. 4, 2003.

FIELD OF THE INVENTION

The present invention relates to the areas of information systems and computer software. In particular, the present invention provides a database access system and a development environment for developing a database access system for business applications.

BACKGROUND INFORMATION

Information and computer technology are an essential component of modern business operations. The utility of computer technology has been enhanced by the coupling of computers with information networks such as the Internet and the World Wide Web ("WWW"). Successful business operations in the global marketplace may require a synergetic relationship between local and distributed operations. For example, localized operations may include research and development, inventory management, customer service, strategic planning, etc. Distributed operations are conducted, for example, by sales personnel in the field who interact with customers and perform such tasks as order generation, customer relations, customer support, etc. Field personnel may utilize mobile devices such as laptop computers or personal digital assistants ("PDAs") for accessing customer information, receiving customer orders, communicating with one or more centralized databases at the home office, etc.

Field personnel may require accurate and timely information regarding the state of business operations in order to effectively perform their jobs. For example, sales personnel may require up-to-the-minute information regarding current inventory levels, product availability and customer data. Conversely, the enterprise may operate more effectively through centralized management of information regarding the operations of field personnel and information collected in the field.

One model for providing the requisite computing environment may involve a plurality of mobile devices operating in an offline mode, in which the offline mode status is transparent to the users. That is, the mobile devices may run applications in offline mode, yet the user may interact with the mobile applications as if they were running in an online mode.

A relational database allows the definition of data structures, storage and retrieval operations and integrity constraints. In such a database, the data and relations between them are organized in tables. A table is a collection of rows or records and each row in a table contains the same fields. Certain fields may be designated as keys, which means that searches for specific values of that field will use indexing. Where fields in two different tables take values from the same set, a "join" operation can be performed to select related records in the two tables by matching values in those fields. The fields may have the same name in both tables. For example, an "orders" table might contain (customer_id, product_code) pairs and a "products" table might contain (product_code, price) pairs. Therefore, in order to calculate a given customer's bill, the prices of all products ordered by that customer would be summed by joining on the product-code fields of the two tables. This can be extended to joining multiple tables on multiple fields. Because these relationships are only specified at retrieval time, relational databases may be classed as a dynamic database management system. (See *The Free On-line Dictionary of Computing*, 1993-2003, by Denis Howe).

There is a need for a method of developing and downloading efficiently a database access system to a mobile application. There is also a need for managing databuffers and redundant copies of records in a mobile application. Additionally, there is a need for managing a limited number of database connections in a run-time environment.

SUMMARY OF THE INVENTION

According to an exemplary embodiment of the present invention, a method for accessing a database is provided. The method includes creating in a design environment a file that defines a metadata. The metadata relates at least one business object and at least one query. The method also includes communicating the file to a mobile device, storing the file on the mobile device, and transforming the file into a binary structure at an initial run of a computer application running on the mobile device. The binary structure is adapted to be read by the computer application. The method also includes recording the binary structure in a memory of the mobile device.

A method is provided which includes retrieving a first record from a database in response to a request from a first recordset and saving the first record on a first bufferpage of a memory. The first bufferpage is associated with the first recordset. The method also includes repeating the previously mentioned steps for a further record. When a next record requested by the first recordset is larger than a freespace on the first bufferpage, the method indicates to save the next record on a second bufferpage of the memory. The second bufferpage is associated with the first recordset.

A method of managing a memory is provided which includes dividing the memory into a plurality of blocks and recording in a first block of the memory in a first databuffer at least a first property of a first record in response to a first request of a first recordset. The method also includes recording in one of the first block and a second block of the memory in a second databuffer at least one of the first property and a second property of the first record in response to a second request of one of the first recordset and a second recordset. The method further includes storing with the first databuffer a pointer to the second databuffer.

A method for providing database access for a plurality of files with a limited number of database access channels is provided which includes receiving a first signal indicating an initiation of a new file. If a desired number of database access channels is greater than or equal to the limited number of database access channels, the method indicates to determine a respective active file corresponding to each of the database access channels. The method also includes sequentially causing each of the active files to access one of a database record and a plurality of database records. The method further includes repeating the step of sequentially causing each of the active files to access one of a database record and a plurality of database records until a second signal is received indicating a first active file has accessed all database records. The method also includes the step of reassigning a first database access channel which was assigned to the first active file to the new file.

A method for providing access to a database in a computing environment for a plurality of recordsets is provided. Each of the plurality of recordsets is associated with a database access channel for fetching records of the plurality of recordsets from the database upon occurrence of a preselected event. The method includes initiating a new recordset and, if a number of the plurality of recordsets is equal to a maximum number of database access channels, sequentially fetching at least one record for each recordset until a first recordset has fetched all records associated with the first recordset. The method further includes assigning the database access channel of the first recordset to the new recordset.

A method of fetching data for a plurality of active files from a database having a limited number of database connections is provided. The method includes assigning each database connection of the limited number of database connections to an active file until one of (i) all of the limited number of database connections have been assigned, and (ii) each active file desiring a database connection has a corresponding assigned database connection. The method also includes determining if any active file desiring the database connection does not have the corresponding assigned database connection. If any active file desiring one of the limited number of database connections does not have a corresponding assigned database connection, the method indicates to fetch a record for each file from the database on the assigned database connection sequentially until all records for at least one file are fetched. The method further includes reassigning the assigned database connection for the at least one file for which all records have been fetched to another active file that does not have a corresponding assigned database connection.

XML (extensible markup language) is a standard for exchanging structured information, and may provide flexibility to the designer by combining human readability with machine readability.

The Data Access Layer, or DAL, collapses the Business Object Layer ("BOL") and the Transaction Layer ("TL") into one layer, and replaces TL database access functionality with embedded, direct database access. Methods within the BOL access the local database tables directly, and the inefficiencies associated with recordset abstraction may thereby be avoided. Memory buffers may also be managed more efficiently within a single layer.

BRIEF DESCRIPTION OF THE DRAWINGS

FIG. 1 shows a schematic diagram of an application that a user uses to interface with a database and the relationship between the system in the run-time environment and the design environment.

DETAILED DESCRIPTION

Figure 2:
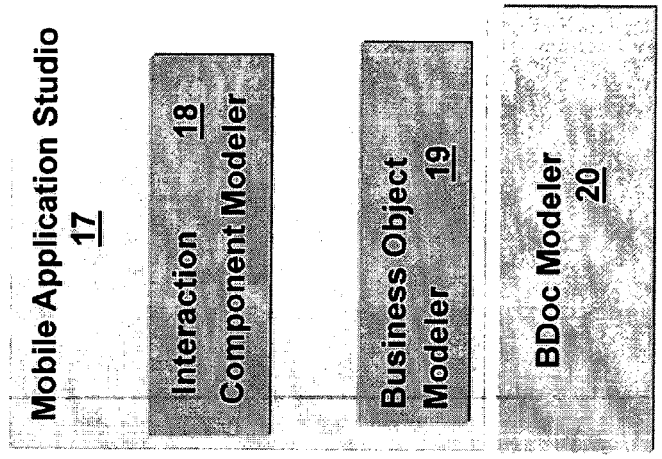
FIG. 2 shows a schematic diagram of an exemplary embodiment of the present invention that a user uses to interact with a database and the relationship between the system in the run-time environment and the design environment.

A mobile client application may be based on an object-oriented software approach and may be divided into three tiers, or layers: the User Interface Layer (UIL), the Business Object Layer (BOL) and the Transaction Layer (TL). The BOL provides the application's business logic, while the TL offers access to the underlying data in a database. The TL provides access to the underlying data by mapping recordsets, referenced by the BOL, to local database tables. The recordset abstraction of the TL may produce inefficiencies in the run-time environment of the mobile client due to latencies associated with data access and translation. Separate memory buffer management may also be required for each layer.

A business object type is the representation of a business entity in the system. It encompasses both the functionality (in the form of methods) and the data (in the form of attributes) of this entity. The implementation details of the business object type may be hidden from the user. The business object type may be accessed through defined functions (also referred to hereinafter as methods). This may be referred to as "encapsulation."

Business object types are used to break a system down into smaller, disjunctive units. As a result, the system's structure is improved while its complexity is reduced. Business object types may form the point of entry for the data and the functions of the system. At the business object type level, both internal systems and various business components can communicate with each other.

An example of a business object type follows. The business object type "FlightBooking" may represent a binding seat reservation for a flight. A special flight booking is identifiable by a booking number and the airline. The business object type "FlightBooking" may be accessed by various methods. These access methods may include: FlightBooking.GetList( ), which may return a list of all flight bookings stored in a system (which may be optionally restricted according to particular search criteria); FlightBooking.CreateFromData( ), which may create a new flight booking in the system. FlightBooking.Cancel( ), which may cancel a flight booking that has already been created; and FlightBooking.Confirm( ), which may convert a flight reservation into a legally binding flight booking.

A business object type may therefore include a business concept and how to realize it in a computer system. The term "business object type" may correspond to the term "class" in object-oriented programming languages.

A specific occurrence of a business object type, for example, a flight booking that is actually stored in the system, may need to be distinguished from the business object type itself. An occurrence of a business object type may be termed an instance of a business object type or a business object (the usual term in object-oriented programming languages).

An example of an instance of a business object type may be the flight booking "LH 4711 FlightBooking." This flight booking is identified by the airline code "LH" and the booking number "4711." The object is described according to its attributes, for example the flight date or the customer number.

A generic business object may represent a physical or logical entity in a business scenario and may be characterized by any of: attributes; methods; events; business rules; and relations to other business objects. A business logic framework may support objects other than business objects including: business collections (short for business 'objects' collections); query objects (used for predefined searches); combinations (used for fetching allowed sets of values); and salient features. A general foundation for modeling business objects may provide elements that are richer and closer to the business domain than the typical elements of relational databases.

FIG. 1 shows a schematic diagram of a system level application that user 12 uses to interface with a database and the relationship between the system in run-time environment 10 and design environment 11. User 12 interfaces with user interface layer 13 which communicates with interaction layer 14. User interface layer 13 may be a display and interaction layer 14 may include a display driver. Interaction layer 14 communicates with business object layer 15, which in turn communicates with transaction layer 16. Transaction layer 16 controls access to a database. Each of the different layers 13, 14, 15, 16 may require a separate memory buffer for functioning. Therefore, four separate buffer memory arrangements may be required to operate the system. The system is designed in design environment 11. Design environment 11 may include mobile application studio 17, which may be adapted to design and create applications, which in turn may be run on mobile devices. Mobile application studio 17 may include interaction component modeler 18 for designing interaction layer 14 and business object modeler 19 for designing business object layer 15. Design environment 11 also may include bdoc modeler 20, which may be adapted to design transaction layer 16. After the system is designed in design environment 11, each respective layer may be converted into a respective layer by converters 21a, 21b, 21c. Converters 21a, 21b, 21c may be a converter, translator or generator, and may output object code, machine readable code, and/or any binary structure readable by a machine. Alternatively, converters 21a, 21b, 21c may simply be a communication outlet for the design components (mobile application studio 17, interaction component modeler 18, business object modeler 19, and/or bdoc modeler 20) to communicate an unformatted system to the mobile system running in run-time environment 10.

Design environment 11 may exist primarily on a network, though the design of the system and the creation of files (in particular XML files) may occur in a mobile device. Run-time environment 10 may exist in both a network and a mobile device.

FIG. 2 shows a schematic diagram of an exemplary embodiment of the present invention that user 12 uses to interact with a database and the relationship between the system in run-time environment 10 and design environment 11. User 12 interfaces with user interface layer 13. User interface layer 13 communicates with interaction layer 14. Interaction layer 14 communicates with business object layer 15. Business object layer 15 includes data access layer 22. Data access layer 22 controls access to a database. Integrating data access layer 22 into business object layer 15 therefore may reduce the number of memory buffers which may be required for functioning of the system. Three or fewer separate buffer memory arrangements may only be required to operate the system.

The system shown in FIG. 2 is designed in design environment 11. A combination of business object modeler 19 of mobile application studio 17 and bdoc modeler 20 (both operating in design environment 11) may determine the structure of business object layer 15 including data access layer 22 (operating in run-time environment 10).

Replacing transaction layer 16 with data access layer 22 integrated in business object layer 15 enables an embedded direct database access, which may be responsible for read and write access. Buffer management may be suited for business object layer 15 since it may avoid recordset abstraction. Business object layer 15's metadata may be enhanced by information from the bdoc modeler 20.

The buffer management as implemented by data access layer 22 may have the advantages that it acts: as a cache of database data; uses minimal memory; avoids fragmentation; avoids unnecessary copies; and supports data from multiple different sized data selections.

Converter 21c, and optionally converters 21a, 21b, may communicate an XML file that is created in design environment 11 to run-time environment 10. In run-time environment 10, the XML file may be loaded onto a mobile device, for instance a laptop computer or PDA. When the application is run for the first time, the XML file is converted into a binary structure that is readable by the machine. This binary structure is then saved on the machine. When the application which accesses the database is subsequently run on the machine, the XML file does not need to be converted. Instead, the binary structure may be read from memory and mapped into the buffer for accessing the database.

The XML file contains metadata. Metadata, in contrast to data, resembles a system in which data can be entered. The metadata sets may be an order, and the order may have a number and may have items. Metadata describes how data itself looks. Bdoc modeler 20 may create this XML file and design the metadata. The conversion of the XML file into a binary structure may occur in run-time environment 10.

Alternatively, the mobile system may load the unformatted files over converters 21a, 21b, 21c from the design components (mobile application studio 17, interaction component modeler 18, business object modeler 19, and/or bdoc modeler 20). The mobile system may then compile, convert, translate, and/or generate object code from the unformatted files on the first running of the application on the mobile system. On subsequent running of the application on the mobile system, the mobile system may use the previously compiled object code or may compile, convert, translate, and/or generate object code from the unformatted files again.

Figure 3:
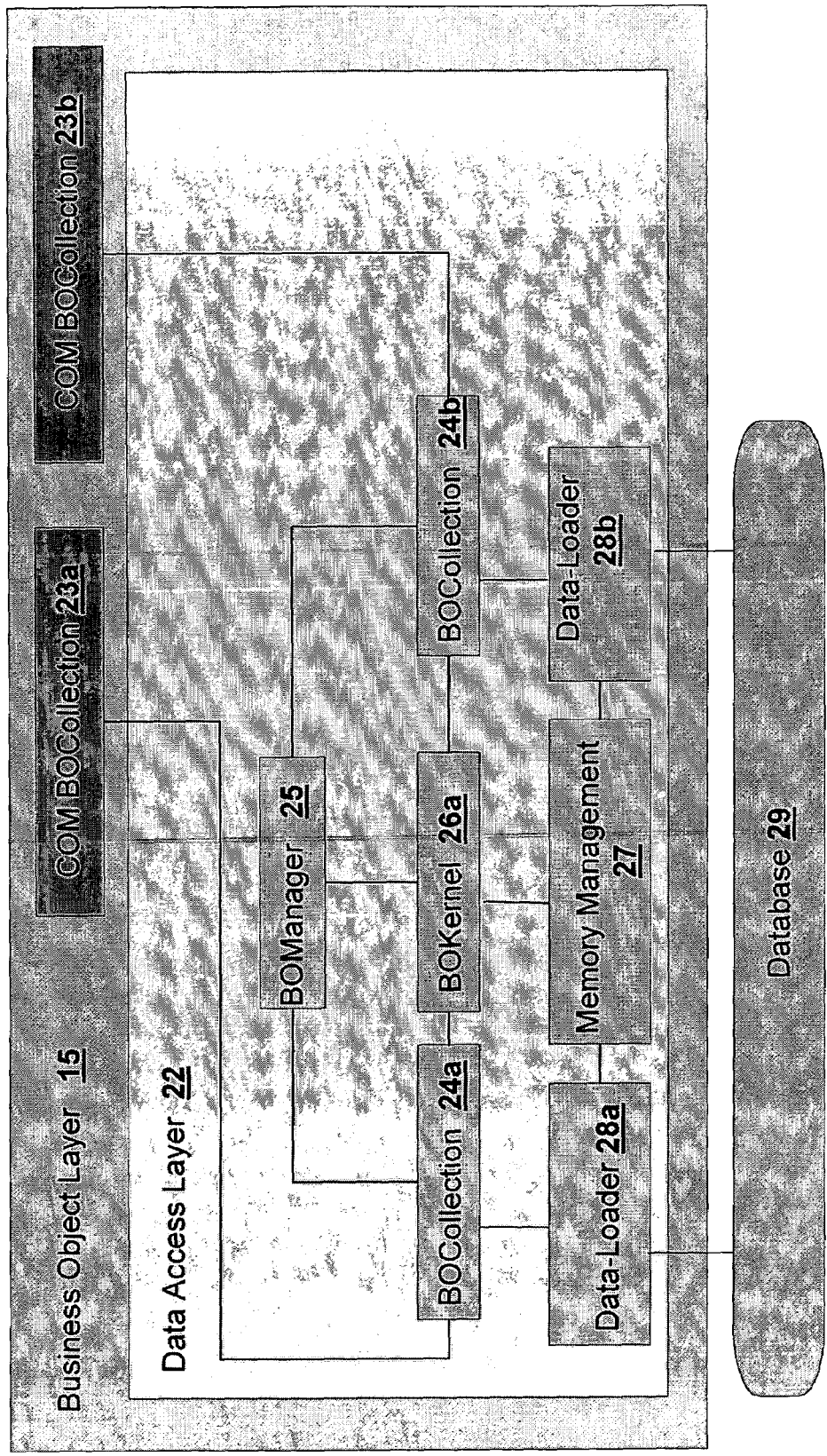
FIG. 3 shows a schematic diagram of an exemplary embodiment of the present invention showing a business object layer (BOL) having a data access layer (DAL) and interacting with a database.

FIG. 3 shows a schematic diagram of an exemplary embodiment of the present invention showing business object layer (BOL) 15 having data access layer (DAL) 22 and interacting with database 29. Data access layer 22 includes data loaders 28a, 28b which access database 29. Data loaders 28a, 28b read records out of database 29 in response to a query or an operation of the application. Data loaders 28a, 28b may only load as much data as may be displayed by a user interface, or tile, within the application. Each of data loaders 28a, 28b may be associated with a different tile of an application. The number of records loaded by data loaders 28a, 28b may be controlled by b.o.collections (business object collections, which may also be referred to hereinafter as a file or an active file) 24a, 24b, respectively. When a complete record set is completely loaded by data loaders 28a, 28b, data loaders 28a, 28b may be terminated because they are no longer needed.

B.o.collections 24a, 24b determine the number of records being requested by the application and communicates those records to com.b.o.collections (communication business object collections) 23a, 23b, respectively, which may be part of the business object layer but which may be outside of the data access layer. Com.b.o.collections 23a, 23b may communicate the data that is to be displayed to a user interface. COM refers to communication technology and may be a way to expose objects to the application code.

B.o.collections 24a, 24b may also communicate the identity of which records are loaded by data loaders 28a, 28b to business object manager (BOManager) 25. Business object manager 25 may be a shared operation that communicates with several b.o.collections 24a, 24b which are active in supplying records to respective tiles or windows of an application.

Business object manager 25 may determine if a particular record loaded by either of data loader 28a or data loader 28b has previously been loaded. If the particular record has not previously been loaded, then business object manager 25 may create a b.o.kernel (business object kernel) 26a for the particular record. Alternatively, business object manager 25 may direct b.o.collection 24a, 24b to create b.o.kernel 26a for the new record. B.o.kernel 26a may store the record in a buffer memory using memory management 27 in a location appropriate to the other records being loaded by the respective data loader 28a, 28b. This location may be determined by memory management 27.

For instance, if records for data loader 28a (corresponding to records for b.o. collection 24a) are being loaded into buffer memory in blocks to allow easy reading and efficient erasing, then the new record will be loaded into the buffer memory in a similar fashion. B.o.kernel 26a may include a key indicating the record stored and the location of the record stored.

If the same record is loaded again by either the same data loader 28a, the other data loader 28b, or another data loader entirely, then business object manager 25 will recognize that the record has been stored because b.o.kernel 26a indicates that this record has been stored. B.o.kernel 26a will store the record again in the buffer memory in a location appropriate to the other data being loaded and as indicated by memory management 27. B.o. kernel 26a will cause the first recording of the record to include a pointer to the second recording of the record, so that the records are linked in a buffer chain.

For example, data loader 28a may load a record from database 29 into b.o.collection 24a. This record may be communicated to com.b.o.collection 23a for display to a user and the identity of this record may also be communicated to business object manager 25. Business object manager 25 may determine if the record has been previously stored in the buffer memory by checking a look-up table. If the record has not been previously loaded into buffer memory, then business object manager 25 may create b.o.kernel 26a or may direct b.o.collection 24a to create b.o.kernel 26a. B.o.kernel 26a may include a pointer, which will point to the address at which memory management 27 records the record in the buffer memory. B.o.kernel 26a may also include a key which identifies the record assigned to b.o.kernel 26a and may also include a counter indicating the number of times which the record is stored for different recordsets which are currently open in the application. A recordset may correspond to a group of records that satisfy a query or are properly displayed in a window or tile. The recordset may be referred to hereinafter interchangeably with the query, window, and/or tile that creates and/or defines the recordset. Data loader 28b may later load the same record from database 29 and may communicate the record to b.o.collection 24b. B.o.collection 24b may communicate the record to com.b.o.collection 23b for display to the user, and may also communicate the identity of the record to business object manager 25. Business object manager 25 may determine that the record has already been stored in the buffer memory by evaluating b.o.kernel 26a and other b.o.kernels which are included in a look-up table in business object manager 25. Business object manager 25 will recognize that the record has been stored since b.o.kernel 26a includes a key identifying the record stored in the buffer memory. The record will be communicated to b.o.kernel 26a by b.o.collection 24b, which will then communicate the record to memory management 27. Memory management 27 will store the record with other records accessed by data loader 28b in the appropriate memory buffer block. Memory management 27 will communicate the location of the record to b.o.kernel 26a. B.o.kernel 26a will then record this second buffer location in a pointer included in the first buffer location of the record. In this way a chain will grow in the event that additional identical records are read from database 29 and stored in the buffer memory. B.o.kernel 26a will point to the first recording of the record in the buffer memory, and the first record will point to the next recording of the same record, and so on.

Each recording of a record may be different even if they relate to the same piece of data since the data in database 29 relating to that record may have changed between one loading of that record and the next loading of the record. Additionally, data loader 28a, 28b may only load some fields (also referred to hereinafter as properties) from database 29 for a particular record. For instance data loader 28a, 28b may load from database 29 only the first three fields, all fields, only the third, seventh and ninth fields, or any other possible combination of fields of a table. Therefore, each recording of a record set might include different combinations of fields.

Inconsistencies may arise between the different data buffers containing the same record, either due to changes in database 29 between different loadings of the record, or, in a read/write scenario, due to changes in the record originating in the application. These inconsistencies may be dealt with in various manners. In one method, the first data buffer may have all the fields. Subsequent loadings may be done from this first buffer, thereby avoiding inconsistencies due to database 29 changing between different loadings by data loader 28a, 28b. In this situation, this first databuffer may not be assigned to any b.o.collection, and may remain open until all b.o.collections referencing that record (by that b.o.kernel) have closed. Alternatively, different versions of the same record may exist within the chain of databuffers. Since the last appended record is the most recent (in the "read only" situation), then simply reading the property from the first record starting from the end of the databuffer chain to include that property would ensure that the property is the most recent version loaded from database 29.

Figure 4:
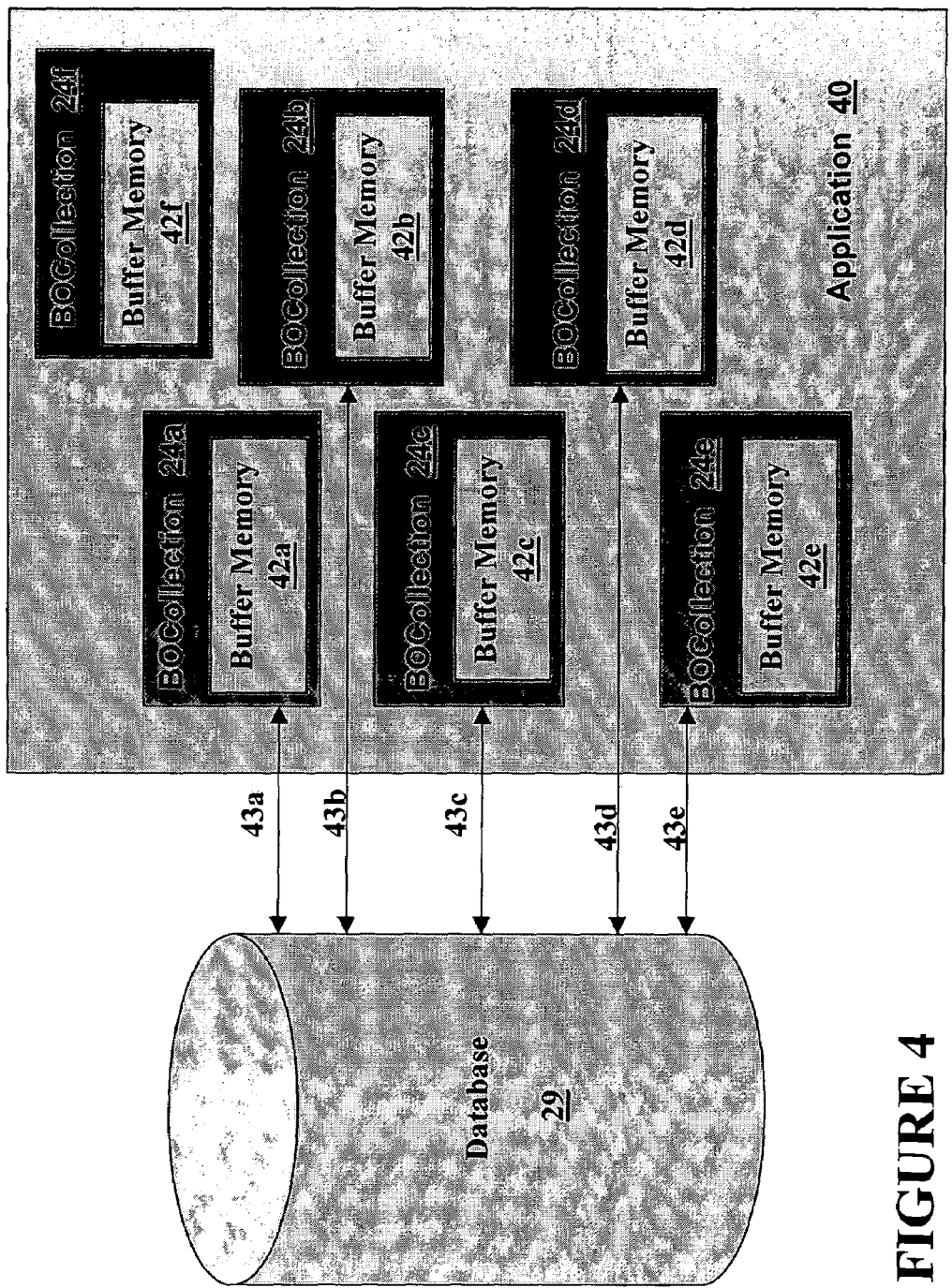
FIG. 4 shows a schematic diagram of an exemplary embodiment of the present invention showing a database and multiple business object collections (b.o.collections or files) of an application accessing the database via channels.

FIG. 4 shows a schematic diagram of an exemplary embodiment of the present invention showing database 29 and multiple b.o.collections 24a-e accessing database 29 via channels 43a-e, respectively. Database 29 may operate with a maximum number of channels 43a-e, which may be determined by software or hardware, and which may be absolute or flexible. Channels 43a-e may each access database 29 for a respective b.o.collection 24a-e. B.o.collections 24a-e may respond to a query or may require other data from database 29. B.o.collections 24a-e may not load all records from the recordset which satisfy the query in order to avoid filling up a buffer memory, from which associated buffer memory 42a-e are divided or partitioned. This fetch-on-demand system may also allow the system to be more responsive to the user's requests by avoiding the situation in which a single query completely fills all of the buffer memory associated with buffer memories 42a-e. Therefore, the system may avoid the situation where it would need to communicate to the user that all records could not be loaded because the query was too broad. However, the fetch-on-demand method may require that each of b.o.collections 24a-e have a dedicated channel 43a-e. These channels 43a-e may each access database 29 sequentially and thereby provide a pointer to database 29 where the next record is located which satisfies the query or other operation accessing database 29. Therefore, when the user scrolls down in the window or tile to reveal more records, each of channels 43a-e would access database 29 for the respective b.o.collections 24a-e. Channels 43 a-e may operate simultaneously to load records for the respective b.o.collections 24a-e.

In the event that all of channels 43a-e are occupied accessing database 29 and another b.o.collection 24f may require access to database 29, the system would begin a process to free a channel to database 29 for b.o.collection 24f. The process may involve sequentially accessing database 29 for each b.o.collection 24a-e, and storing the record for each b.o.collection 24a-e in associated buffer memory 42a-e. Alternatively, blocks of records for each b.o.collections 24a-e may be accessed and stored in associated buffer memory 42a-e. The blocks of records may be of an equal size for each b.o.collection 24a-e, and may be blocks of 2 records, 3 records, or more. The sequential accessing of database 29 for each b.o.collection 24a-e continues until all the records in a recordset for one of b.o.collections 24a-e has been loaded and stored in associated buffer memory 42a-e. After all the records for one application have been loaded and stored, that application may no longer require a channel to database 29, and therefore the open channel may be dedicated to b.o.collection 24f which may require a channel.

Figure 5:
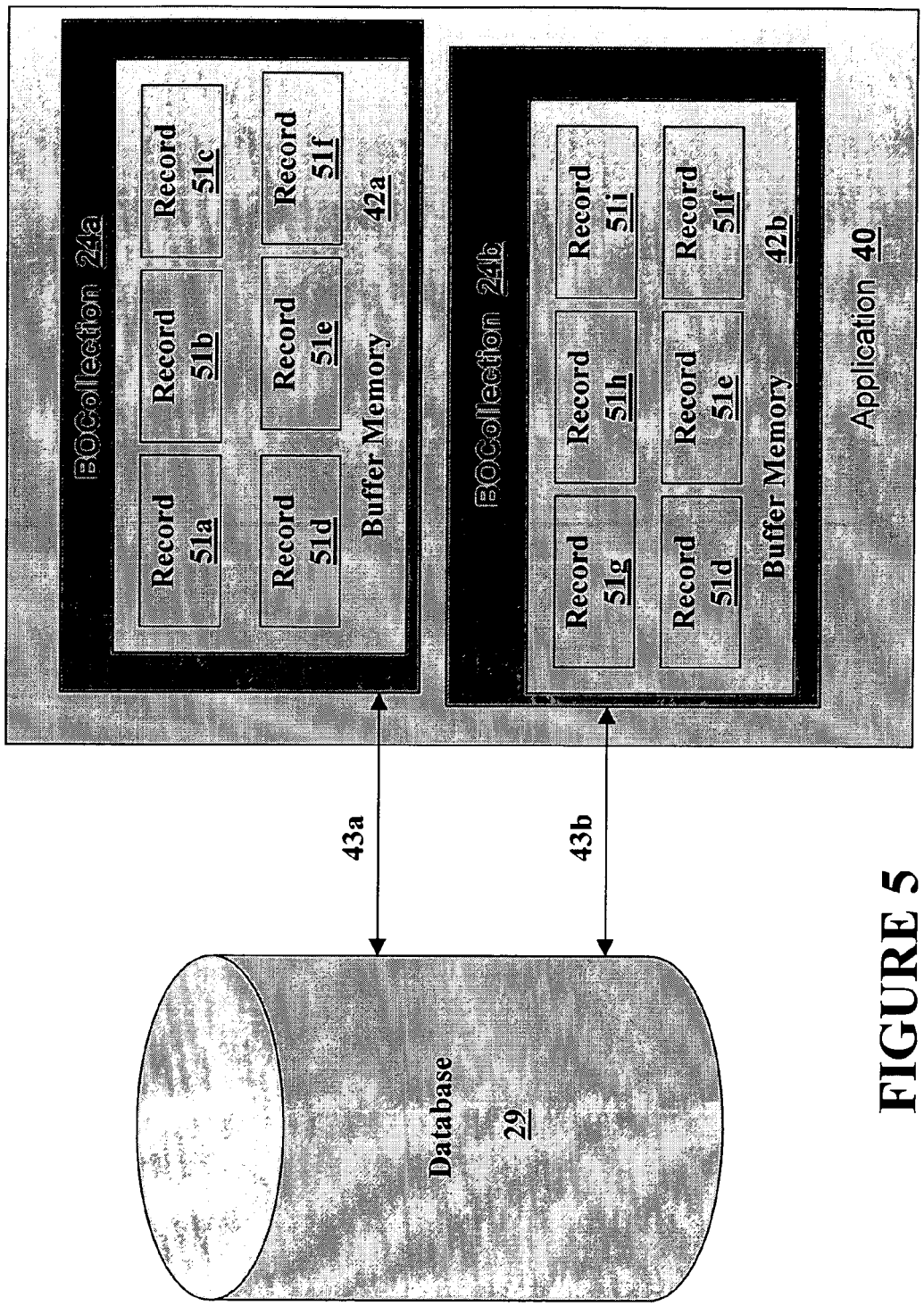
FIG. 5 shows a schematic diagram of an exemplary embodiment of the present invention showing a database and multiple b.o.collections with buffer memories having records.

FIG. 5 shows a schematic diagram of an exemplary embodiment of the present invention showing database 29 and b.o.collections 24a, 24b with buffer memories 42a, 42b having records 51a-i. B.o.collections 24a, 24b are both part of application 40, and may represent queries, tiles or windows open in the user interface. Application 40 may alternatively have more or fewer b.o.collections. Each of b.o.collection 24a, 24b has an associated buffer memory 42a, 42b. B.o.collection 24a includes buffer memory 42a, which in turn stores records 51a-f. B.o.collection 24b includes buffer memory 42b, which in turn stores records 51d-i. B.o.collections 24a, 24b may include redundant records in respective buffer memories 42a, 42b (for instance, records 51d-f). Keeping redundant records 51d-f stored in two (or more) separate buffer memories 42a, 42b may cause some inefficiency due to a short-term increase in memory requirements. However, keeping related records necessary for b.o.collections 24a, 24b in adjacent memory in buffer memories 42a, 42b, for instance in buffer pages or buffer blocks, may increase long term memory efficiency by eliminating holes and other unusable memory areas by allowing complete pages or blocks of memory to be freed when b.o.collections 24a, 24b are shut down. Redundant records 52d-f recorded in different buffer memories 42a, 42b are related by pointers and b.o.kernels as described above and hereinafter.

Figure 6:
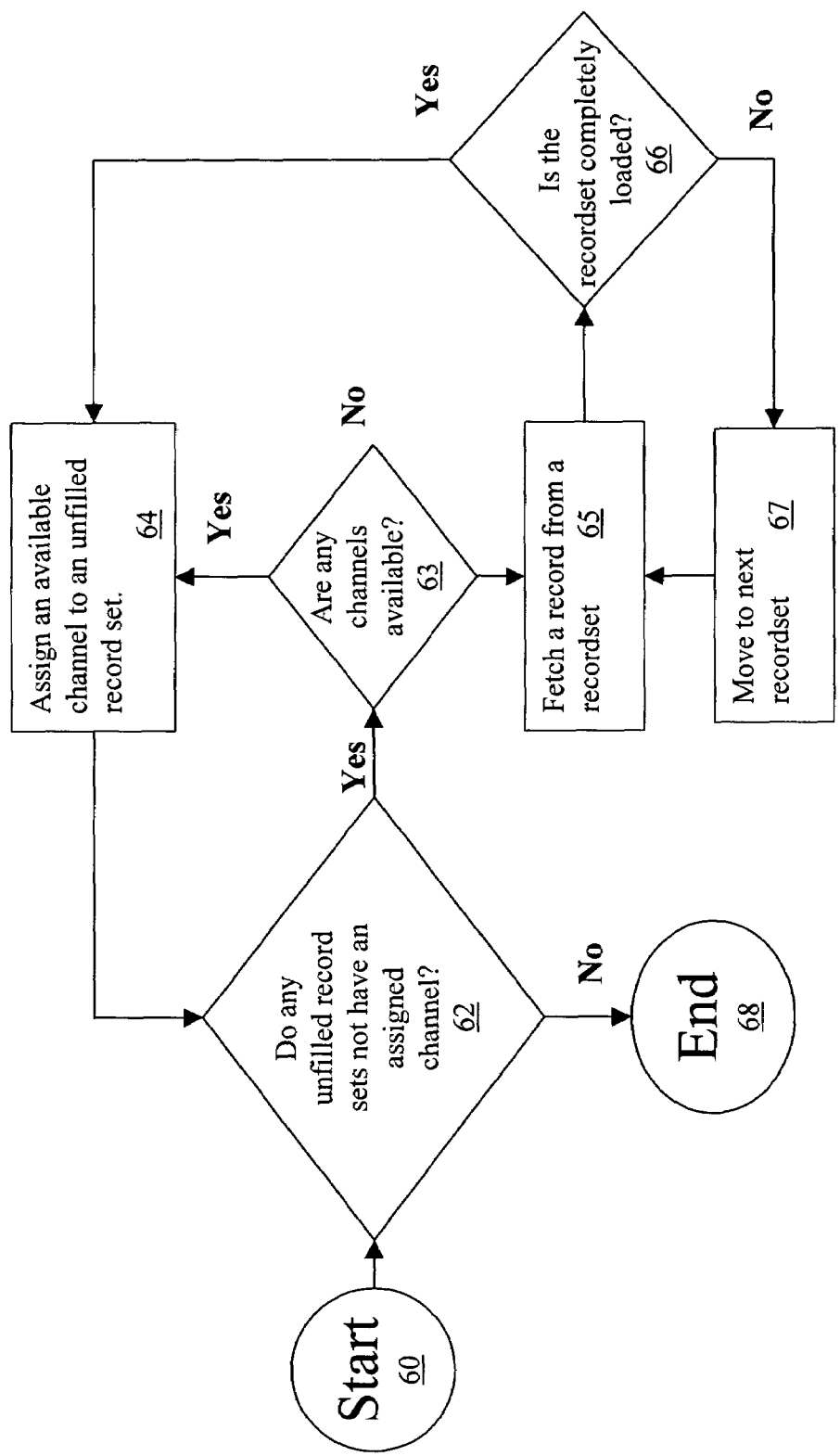
FIG. 6 shows a flowchart of an exemplary method of the present invention for managing a limited number of channels to a database in a fetch-on-demand application environment.

FIG. 6 shows a flowchart of an exemplary method of the present invention for managing a limited number of channels to a database in a fetch-on-demand application environment. The flow proceeds from start circle 60 to question 62, which asks whether any unfilled record sets do not have an assigned channel. An unfilled recordset in this context represents a query, window, and/or tile which has not loaded into the buffer memory all the records which satisfy the query or belong in the window or tile. In the fetch-on-demand situation, a window or tile may only load from a database a sufficient number of records satisfying a query to fill a window or tile. Therefore, queries that determine a very large recordset would not completely fill the databuffer in a fetch-on-demand system. As a user scrolls through the recordset via the window or tile, new records would be accessed from the database into memory for display in the window or tile. Each query, tile, and/or window which includes a recordset which has not been completely loaded into buffer memory may require a channel to the database for accessing the remaining records to complete the recordset. The channel may include a pointer which would indicate at which point in the database to begin reviewing for additional records that satisfy the query and/or should properly be displayed in the tile and/or window. The number of channels to the database for an application may be limited by hardware, software, and/or design considerations. For instance, the number of database access channels for an application may be limited to five. Therefore, if a sixth query, tile and/or window attempts to access the database, then the unfilled recordset associated with that sixth query, tile and/or window would not have an assigned channel.

If the answer to question 62 is yes, the flow proceeds to question 63, which asks whether there are any channels available. If the answer is yes, the flow proceeds to action 64, which indicates to assign an unassigned channel to the unfilled record set. From action 64, the flow proceeds again to question 62. If the answer to question 63 is negative, the flow proceeds to action 65, which indicates to fetch a record from a recordset. Alternatively, a block of records may be fetched from a recordset. The size of the blocks of records may correspond to the size of the buffer blocks or pages used by the system. From action 65, the flow proceeds to action question 66, which asks whether the recordset is completely loaded. If the answer to question 66 is negative, the flow proceeds to action 67, which indicates to move to a next sequential record set. From action 67, the flow proceeds to action 65. If the answer to question 66 is affirmative, the flow proceeds to action 64, which is described above. If the response to question 62 is negative, the flow proceeds to end 68.

Figure 7:
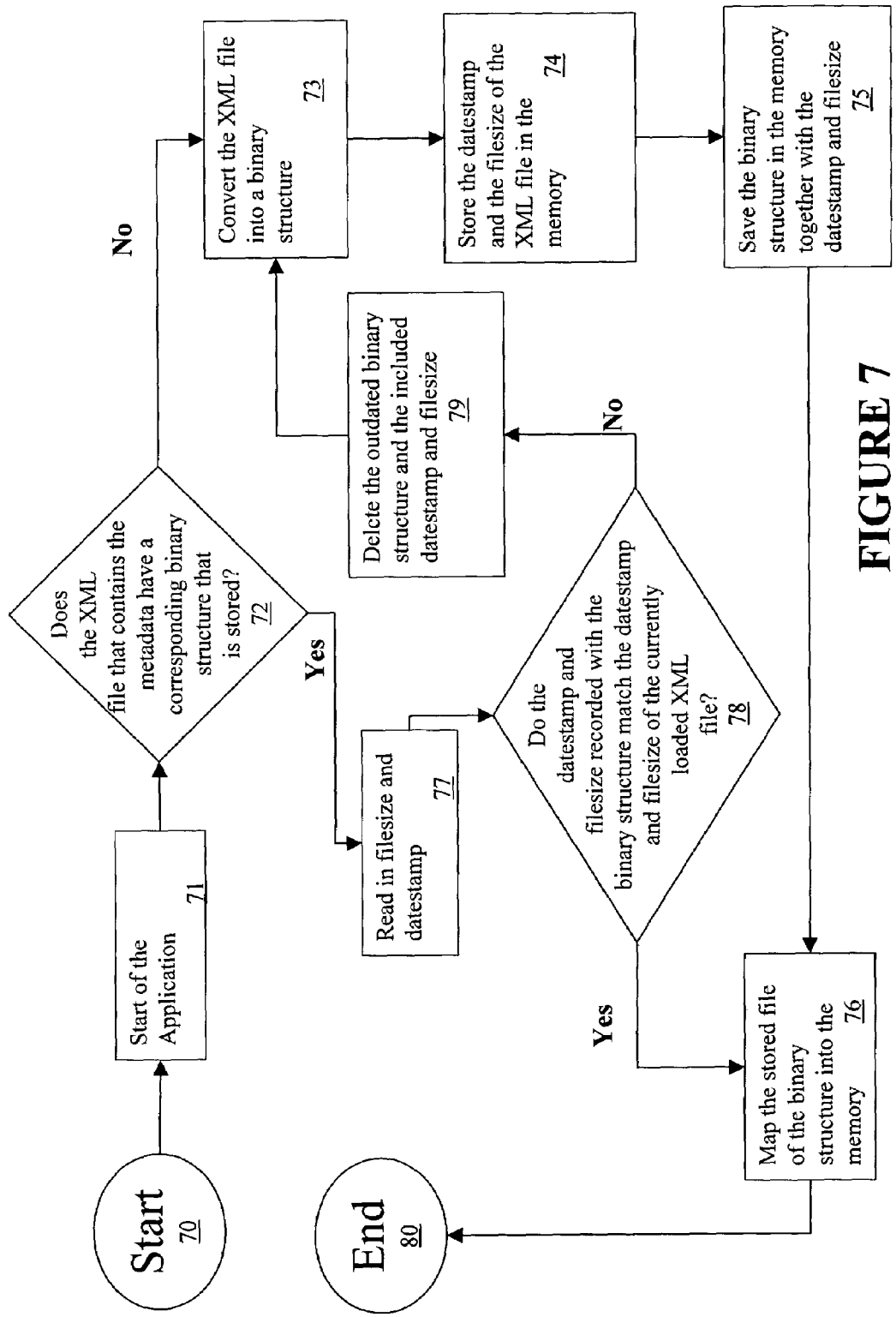
FIG. 7 shows a flowchart of an exemplary method of the present invention showing the relationship between an XML file created in the development environment and a binary structure of the XML file for use in a run-time environment.

FIG. 7 shows a flowchart of an exemplary embodiment of the present invention showing the relationship between an XML file created in the development environment and a binary structure of the XML file for use in a run-time environment. The flow proceeds from start 70 to action 71, in which an application is started. The flow then proceeds to question 72, which asks whether the XML file that contains the metadata has a corresponding binary structure stored. If the response to question 72 is negative, the flow proceeds to action 73, which indicates to convert the XML file into a binary structure. From action 73, the flow proceeds to action 74, which indicates to store the datestamp and the filesize of the XML file in the memory. From action 74, the flow proceeds to action 75, which indicates to save the binary structure in the memory together with the datestamp and the filesize. From action 75, the flow proceeds to action 76, which indicates to map the stored file of the binary structure in the memory. From action 76, the flow proceeds to end 80. If the response to question 72 is affirmative, the flow proceeds to action 77, in which the filesize and datestamp are read. From action 77, the flow proceeds to question 78, which asks whether the datestamp and filesize recorded with the binary structure match the datestamp and filesize of the currently loaded XML file. If the response to question 78 is negative, the flow proceeds to action 79, which indicates to delete the outdated binary structure and the included datestamp and filesize records. From action 79, the flow proceeds to action 73. If the response to question 78 is affirmative, the flow proceeds to action 76.

Figure 8:
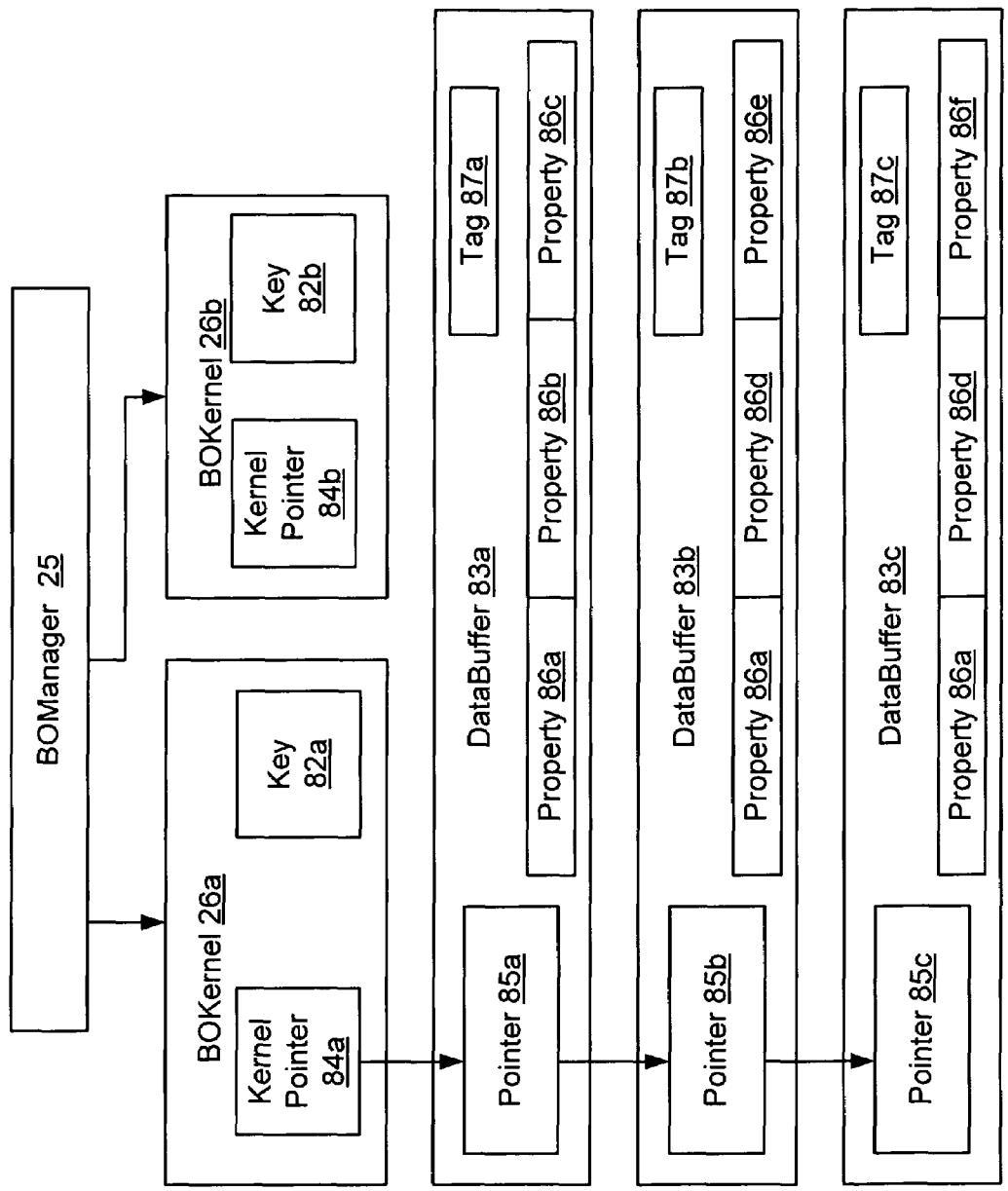
FIG. 8 shows a schematic diagram illustrating the relationship between a BOManager, BOKernel and several databuffers.

FIG. 8 shows a schematic diagram illustrating the relationship between a business object manager (BOManager) 25, b.o.kernels 26a, 26b, and databuffers 83a, 83b, 83c. Business object manager 25 includes a look-up table for the records which have been loaded into a memory buffer. Each record loaded into the memory buffer has b.o.kernel 26a, 26b or another b.o.kernel. B.o.kernel 26a, 26b includes kernel pointer 84a, 84b, respectively. Kernel pointer 84a, 84b, points to a position in the buffer that hold the first recording of the unique record designated for b.o.kernel 84a, 84b. For example, b.o.kernel 84a has kernel pointer 84a which points to databuffer 83a. Databuffer 83a holds properties 86a, 86b, 86c which represent fields in a row or record from a datatable of the database. Properties 86a, 86b, 86c may include all the fields of one record, or only some of the fields of one record which may be required for a b.o.collection. Databuffer 83a may also include a pointer 85a which points to another databuffer 83b which holds the next recording of the same record held in databuffer 83a. Databuffer 83b may also include all or only some of the properties associated with the record, and is shown as including property 86a in common with databuffer 83a, as well as different properties 86d, 86e. Databuffer 83b also includes a pointer 85b which points to the next recording of the record, which in particular points to databuffer 83c. Databuffer 83c includes property 86a in common with databuffer 83a, property 86d in common with databuffer 83b, and unique property 86f. B.o.kernel 26b represents another record and includes kernel pointer 84b and key 82b. Key 82a of b.o.kernel 26a may include such information as an identifier of the record assigned to b.o. kernel 26a counter indicating the number of recordings of the record which exist in the buffer chain.

When a b.o.collection closes and therefore may no longer require a supporting databuffer, that databuffer can close. The pointer from that databuffer can be written into the next earliest recorded record, thereby overwriting the pointer that pointed to the now-erased databuffer and exchanging it with the databuffer recorded after the now-erased databuffer. In this manner, the chain of databuffers is maintained. Keys 82a, 82b include a counter and may therefore include information showing that no databuffers holding the record assigned to b.o.kernel 26a, 26b are active, and that therefore b.o.kernel 26a, 26b and any remaining databuffers may be erased. Databuffer 83a, and any other databuffer that represents the first databuffer pointed to by kernel pointer 84a or any other kernel pointer, may include more than just the particular properties which may be required by the b.o.collection that caused the creation of the databuffer and the b.o.kernel. Databuffer 83a (or any other first recording of the record in the databuffer), may include all the properties of the record, and therefore may provide a source for loading subsequent databuffers rather than loading from the database. This method may avoid problems with changing records due to read/write applications and/or a dynamic database.

Kernel pointer 84a points to databuffer 83a and pointer 85a of databuffer 83a would now point to databuffer 83c instead of databuffer 83b after databuffer 83b is closed. Pointer 85a of databuffer 83a is rewritten in this situation. B.o.kernel 26a tracks the number of usages of the data from the application. When the last databuffer is erased, the corresponding b.o.kernel may be erased as well. Alternatively and equivalently, when no more b.o.collections refer to the key of that b.o.kernel, then no more databuffers for that record are in use, and therefore the b.o.kernel may be erased as well. The b.o.kernel has a counter of the number of databuffers and the number of record sets that are connected to the b.o.kernel (via b.o.collections). Business object manager 25 is a manner of searching for a given key and may include a look-up table (similar to a primary key in a database table).

Databuffers 83a-c include tags 87a-c, respectively, which identify the b.o.collection which created them (by the data loader). Tags 87a-c enable b.o.kernel 26a to determine which data buffer (in the chain) may be dropped when a b.o.collection is being deleted.

The foregoing discussion is for a read-only situation. In a read-write situation, the first buffer to which b.o. kernel 26a points may include all properties of the record. This first buffer may be updated as records are modified and may be used as a data source when new copies of the record are requested by a b.o. collection. This first buffer may be written back into the database when b.o. kernel 26a has no more active b.o. collections associated with it. Saving the record of this databuffer into the database may then update the database according to the modifications to the record which result from the user's interaction with the application.

Figure 9:
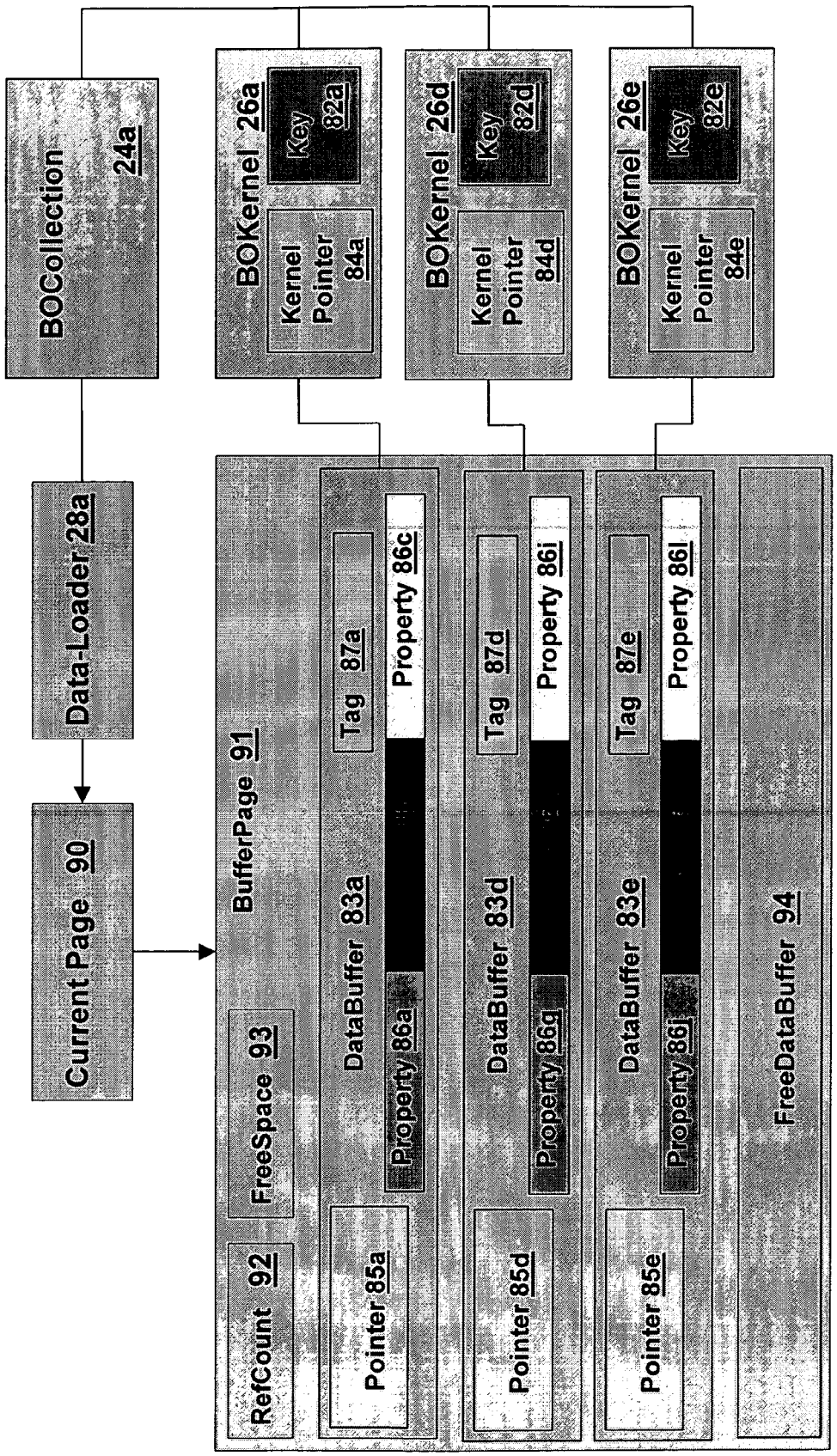
FIG. 9 shows a schematic diagram illustrating the relationship between a BOCollection, BOKernels having keys, and a buffer page having several databuffers.

FIG. 9 shows a schematic diagram illustrating the relationship between b.o.collection 24a, b.o.kernel 26a, 26d, 26e having keys 82a, 82d, 82e, respectively, and bufferpage 91 having databuffers 83a, 83d, 83e. Bufferpage 91 is a fixed unit of buffer memory, and may be 8 kilobytes, 4 kilobytes, or any other appropriate size. B.o.collection 24a represents a query, window and/or tile of an application that may require a recordset. B.o.collection 24a operates in a fetch-on-demand environment. For each record fetched, a b.o.kernel is created if no other b.o.collection has accessed that record. Otherwise, the record is attached to a chain that begins with a b.o.kernel for the record that has been previously accessed by either another b.o.collection or b.o.collection 24a.

B.o.collection 24a may demand that a record be loaded from the database by dataloader 28a. Dataloader 28a may load the record and then determine where to write the data into buffer memory by reviewing current page 90. Current page 90 points to bufferpage 91, which represents the current page. Bufferpage 91 includes refcount 92 and freespace 93. Refcount 92 indicates the number of references (or databuffers) in bufferpage 91, and freespace 93 indicates the amount of freespace remaining in bufferpage 91. As shown in FIG. 9, refcount 92 would indicate the number 3, for databuffers 83a, 83d, and 83e. Additionally, freespace 93 would indicate the size of freedatabuffer 94.

For instance, the last record loaded in bufferpage 91 was the record in databuffer 83e. Dataloader 28a loaded the record into databuffer 83e on bufferpage 91. Dataloader 28a compared the size of the record of databuffer 83e with the remaining free space in bufferpage 91, as determined by freespace 93, and since the size of the record of databuffer 83e was smaller than freespace 93, dataloader 28a loaded the data into bufferpage 91. Dataloader 28a did not change the designation in current page 90. Therefore, current page 90 points to bufferpage 91, and freespace 93 includes a number which corresponds to the size of the available memory in bufferpage 91, which is freedatabuffer 94.

Buffers may be sized according to the selected data and grouped into pages per selection. Each row of data may belong to one business object (BO, represented by a b.o.kernel). Different data selections might retrieve different parts of these business objects. In a typical case, 3-4 attributes may be retrieved out of a business object with up to 100 attributes.

Saving into the memory buffer all 100 attributes in each row would make the row large and would fill the memory buffer quicker.

The data for one row is stored in a databuffer. Multiple databuffers may be chained to each b.o.kernel. The data selection for databuffer 83a includes properties 86a, 86b, 86c. Databuffers 83a, 83d, 83e from multiple data selections (multiple records) may contain fields for the same business object. Each of databuffers 83a, 83d, 83e is chained on a corresponding b.o.kernel 26a, 26d, 26e. Databuffers 83a, 83d, 83e which are loaded for one data selection represented by b.o.collection 24a are kept in bufferpage 91. Databuffers 83a, 83d, 83e may also include a pointer indicating on what buffer page 91 they are stored. Bufferpage 91 may have a fixed size (for example, 8 kilobytes) and may be filled as data (records) for b.o.collection 24a is being loaded.

In order to determine the lifetime of bufferpage 91, each of databuffers 26a, 26d, 26e includes a respective tag 87a, 87d, 87e, respectively, which includes a reference to bufferpage 91. B.o.collection 24a includes a reference to current page 90 via dataloader 28a that shows which bufferpage 91 is currently being filled. As long as there is enough free space on bufferpage 91, as indicated by freespace 93, newly loaded data buffers are put on the same bufferpage 91. Tags 87a, 87d, 87e, identify their respective databuffers 83a, 83d, 83e with b.o.collection 24a. If b.o.collection 24a shuts down, corresponding databuffers 83a, 83d, 83e may then be removed from the chain of their associated b.o.kernels 26a, 26d, 26e and refcount 92 of bufferpage 91 will be set to zero. Then bufferpage 91 may be freed to be overwritten.

With respect to FIG. 9, a typical scenario might be:
Current Page gets allocated, RefCount 0, FreeSpace 8K
First DataBuffer gets filled, RefCount 1, FreeSpace 7K
2nd DataBuffer gets filled, RefCount 2, FreeSpace 6K
. . . 8th DataBuffer gets filled, RefCount 8, FreeSpace 0K At this point, dataloader 28a allocates a new bufferpage if additional records need to be loaded. If b.o.collection 24a is closed or deleted, databuffers 83a, 83d, 83e may also be closed, unless any of databuffers 83a, 83d, 83e is the first record in any chain from b.o.kernel 26a, 26d, 26e (in other words, if kernel pointer 84a, 84d, 84e, respectively, points directly to any of databuffers 83a, 83d, 83e). Any databuffer for which this is not true may be deleted. Therefore, if one databuffer must remain, then:

7 data buffers deleted, RefCount 1, FreeSpace 0K

The space created by erasing the other databuffers is not added to freespace 93 in this situation because dataloader 28a would not look at bufferpage 91 for loading data since current page 90 would point to another bufferpage. Additionally, since each databuffer may have a different size, attempting to load into a bufferpage which has only been partially freed would increase fragmentation within the bufferpage and therefore would decrease memory buffer efficiency. Finally, continuing the example above:

when the last data buffer is deleted, RefCount 0, FreeSpace 0K

Now the whole of bufferpage 91 is freed, and therefore, when any dataloader needs a bufferpage for loading, current page 90 may choose bufferpage 91.

There are two different kinds of data buffers, which may be distinguished by a discriminator. A compressed layout, in which all fields use the actual needed space is possible. This buffer type may be used for "read only" access, which is the case for all data read from the database. An expanded layout, in which all fields have the maximum space is also possible. This buffer type is able to store data of any allowed length. It is allocated when the business object becomes dirty or is newly created. Each row of the record set may have a key.

Figure 10:
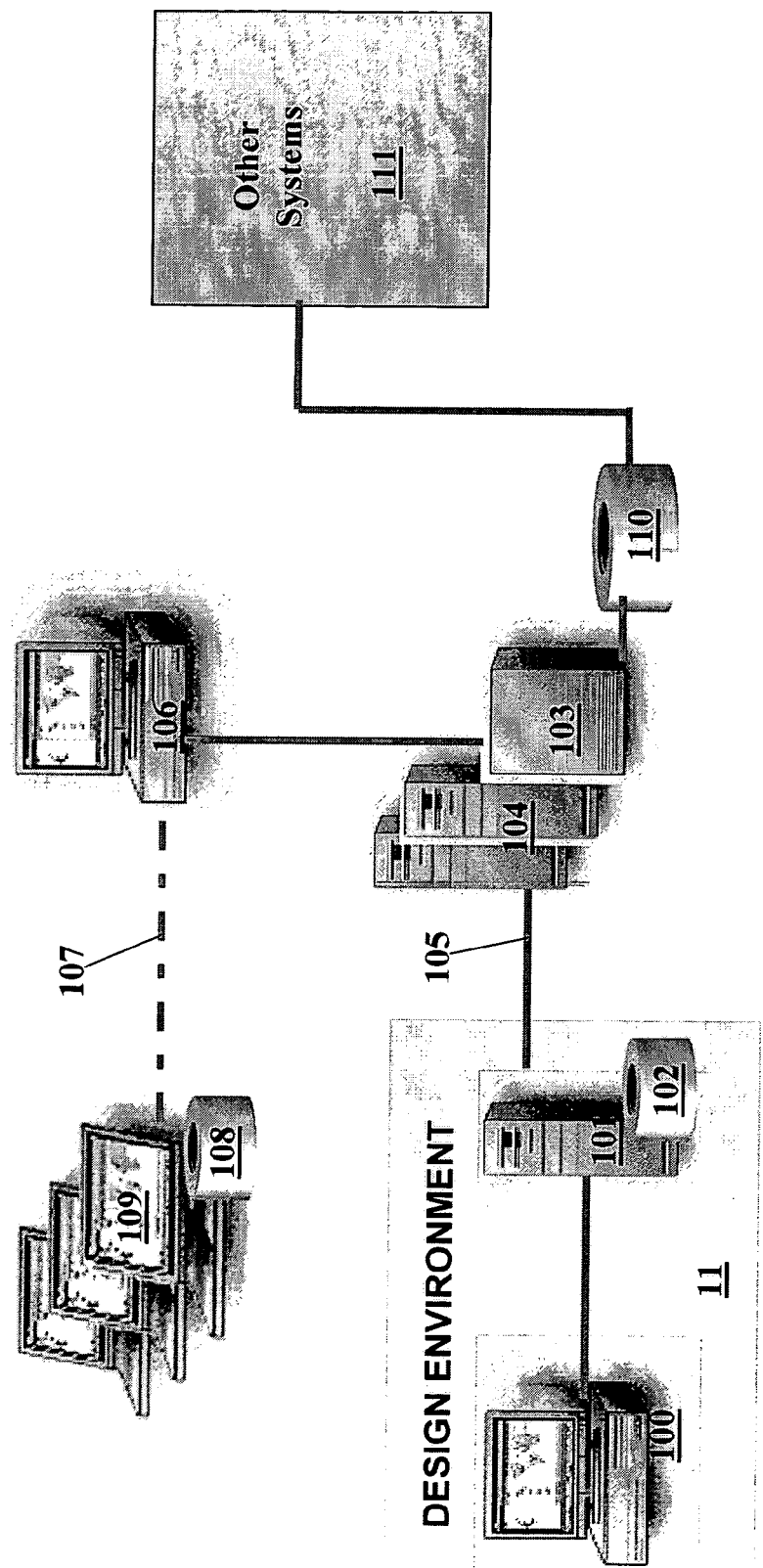
FIG. 10 shows a schematic diagram of an exemplary embodiment of a system of the present invention showing a mobile system and a network.

FIG. 10 shows a schematic diagram of an exemplary embodiment of a system of the present invention showing mobile system 109 and network 103. Mobile system 109 may include one or more mobile clients, and may include laptops and PDAs. Connected to mobile system 109 is database 108, which may be a user database that is synchronized with central database 110 when mobile system 109 is connected to network 103. Mobile system 109 may connect to network 103 via connection 107, which may be a wireless connection, bus connection, or telephone connection. Connection 107 may connect mobile system 109 and communication station 106. Communication station 106 may connect by a hardwire connection to network 103. Network 103 may include one or more network servers 104 and may couple to central database 110. Network 103 may also connect to other systems 111, which may include the internet or any other electrical device or electronic system. Network servers 104 may also connect to mobile repository server 101, which may include a mobile repository database 102. Mobile development workstation 100 may connect to mobile repository server 101. Mobile repository server 101, mobile repository database 102, and mobile development workstation 100 may all exist in development environment 11. A mobile system may be designed on mobile development workstation 100 and tested using a sample database on mobile repository database 102.

Mobile development workstation 100 may be used to create an XML file that provides information on how a database access system should behave which may be running on the mobile application. The XML file, or other human readable file, may describe how business objects are mapped into a database table. The XML file may also indicate how to execute queries and may contain SQL statement and/or portions of SQL statements. For example, a user may enter a customer name but not an address (or other field). The system may then use a piece of the SQL statement that is dedicated to the field that has been input by the user. There may be two things in the SQL statements: data to be retained (i.e. attributes of the business objects); and criteria for matching and/or selecting records from the database. The XML file (or other human readable computer file) may describe both parts of the SQL statements. The XML file may have queries for SQL statements for two type queries. The first type of query may be the objects which have a field value which satisfies a query. This group of objects may constitute a list. A second type of query may load a whole business object. The record corresponding to the business object may be loaded and may not be immediately displayed for the user. For example, a user may click on a field in a list of partial records and the remaining fields in that record may be loaded. If the user clicks again on the field, all the records for that business object may be displayed. A different SQL statement may be used for this purpose. The XML file may describe how to fetch data from the database, and in particular may describe how build SQL statements for executing against the database. The XML file may also describe which field of the record is the key (for example, a unique identifier) of the record. This key may be saved in the b.o.kernel for identification by the b.o.manager of the records which have been loaded from the database into the memory of the mobile device. If an SQL statement is a query, then the data retrieved is for read-only purposes, and therefore only the fields requested may be retrieved from the database. If the data is for writing purposes also, then all fields associated with the b.o.object should be retrieved from the database. The XML file is human readable and may be modified on the mobile device, though typically this may only be done in a development situation for prototyping purposes.

Figure 11:
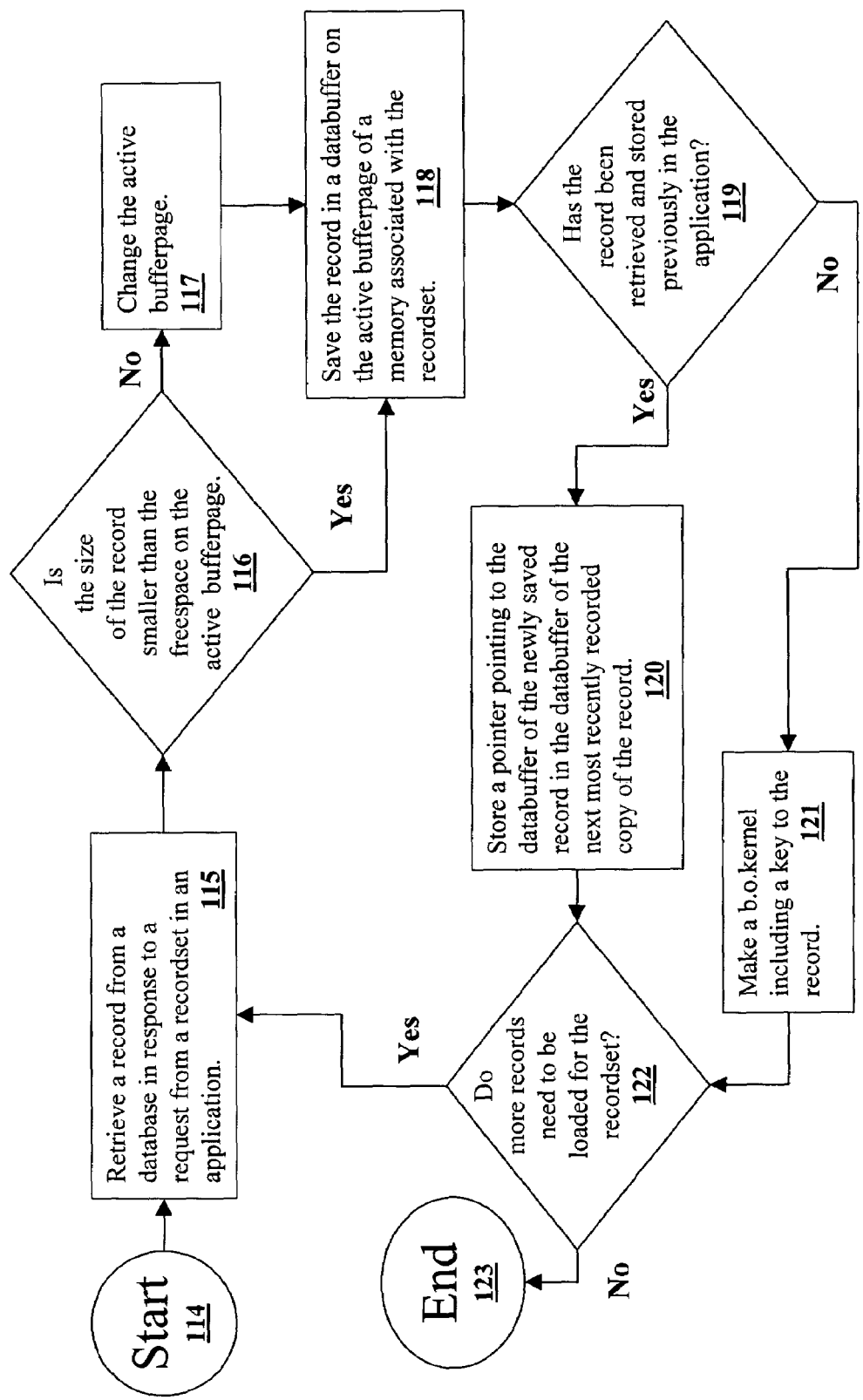
FIG. 11 shows a flowchart of an exemplary method of the present invention for storing records in a memory.

FIG. 11 shows a flowchart of an exemplary method of the present invention for storing records in a memory. The flow starts in start circle 114 and proceeds to action 115, which indicates to retrieve a record from a database in response to a request from a recordset in an application. From action 115, the flow proceeds to question 116, which asks whether the size of the record is smaller than the freespace on the active bufferpage. If the response question 116 is negative, the flow proceeds to action 117, which indicates to change the active bufferpage. From action 117, the flow proceeds to action 118, which indicates to save the record in a databuffer on the active bufferpage of a memory associated with the recordset. If the response question 116 is affirmative, the flow proceeds to action 118. From action 118, the flow proceeds to question 119, which asks whether the record been retrieved and stored previously in the application. If the response question 119 is affirmative, the flow proceeds to action 120, which indicates to store a pointer pointing to the databuffer of the newly saved record in the databuffer of the next most recently recorded copy of the record. From action 120, the flow proceeds to question 122. If the response question 119 is negative, the flow proceeds to action 121, which indicates to make a b.o.kernel including a key to the record. From action 121, the flow proceeds to question 122, which asks whether more records need to be loaded for the recordset. If the response question 122 is affirmative, the flow proceeds to action 115. If the response question 122 is negative, the flow proceeds to end circle 123.

While the present invention has been described in connection with the foregoing representative embodiment, it should be readily apparent to those of ordinary skill in the art that the representative embodiment is exemplary in nature and is not to be construed as limiting the scope of protection for the invention as set forth in the appended claims.

What is claimed is:

1. A method of managing fixed units of buffer memory associated with a mobile client application, comprising:
   retrieving a record stored in a remote database memory;
   determining a size of the retrieved record and a size of a freespace of a current fixed unit of buffer memory and:
      saving the retrieved record in the current fixed unit of buffer memory if the size of the retrieved record is smaller than the freespace of the current fixed unit of buffer memory;
      saving the retrieved record in a next fixed unit of buffer memory if the size of the retrieved record is larger than the freespace of the current fixed unit of buffer memory;
   determining if the retrieved record was previously retrieved and stored by the mobile client application and:
      storing a pointer pointing from a fixed unit of buffer memory storing a most recent copy of the retrieved record to a fixed unit of buffer memory storing a new copy of the retrieved record, if the retrieved record was previously retrieved and stored by the mobile client application;
      creating a business object kernel including a key pointing to the fixed unit of buffer memory storing the new copy of the retrieved record, if the retrieved record was not previously retrieved and stored by the mobile client application, wherein the key comprises a counter having a value that is incremented by one each time the retrieved record is redundantly stored in the buffer memory associated with the mobile client application.

2. The method of claim 1, wherein determining if the retrieved record was previously retrieved and stored by the mobile client application comprises checking a look-up table.

3. The method of claim 1, further comprising storing the business object kernel in a look-up table.

4. A method of managing fixed units of buffer memory associated with a mobile client application, comprising:
   retrieving a first record from a datatable stored in a remote database memory, the first record comprising a first set of data fields of a first row in the datatable;
   determining a size of the first record and a size of a freespace of a current fixed unit of buffer memory and:
      saving the first record in the current fixed unit of buffer memory if the size of the retrieved record is smaller than the freespace of the current fixed unit of buffer memory;
      saving the retrieved record in a next fixed unit of buffer memory if the size of the retrieved record is larger than the freespace of the current fixed unit of buffer memory;
   creating a business object kernel comprising a kernel pointer pointing to the fixed unit of buffer memory storing the first record;
   storing the business object kernel in a lookup table;
   storing a key with the business object kernel, the key identifying the first record as being assigned to the business object kernel;
   storing a counter with the business object kernel, the counter having a value indicating a number of times any portion of the first row in the datatable is stored in the buffer memory associated with the mobile client application;
   retrieving a second record from the datatable stored in the remote database memory, the second record comprising a second set of fields of the first row in the datatable;
   determining a size of the second record and the size of the freespace of a current fixed unit of buffer memory and:
      saving the second record in the current fixed unit of buffer memory if the size of the retrieved record is smaller than the freespace of the current fixed unit of buffer memory;
      saving the second record in a next fixed unit of buffer memory if the size of the retrieved record is larger than the freespace of the current fixed unit of buffer memory;
   storing a pointer pointing from the fixed unit of buffer memory storing the first record to the fixed unit of buffer memory storing the second record;
   incrementing the value of the counter by one to indicate that the first row of the datatable has been redundantly stored in the buffer memory associated with the mobile client application.

* * * * *